United States Patent Office.

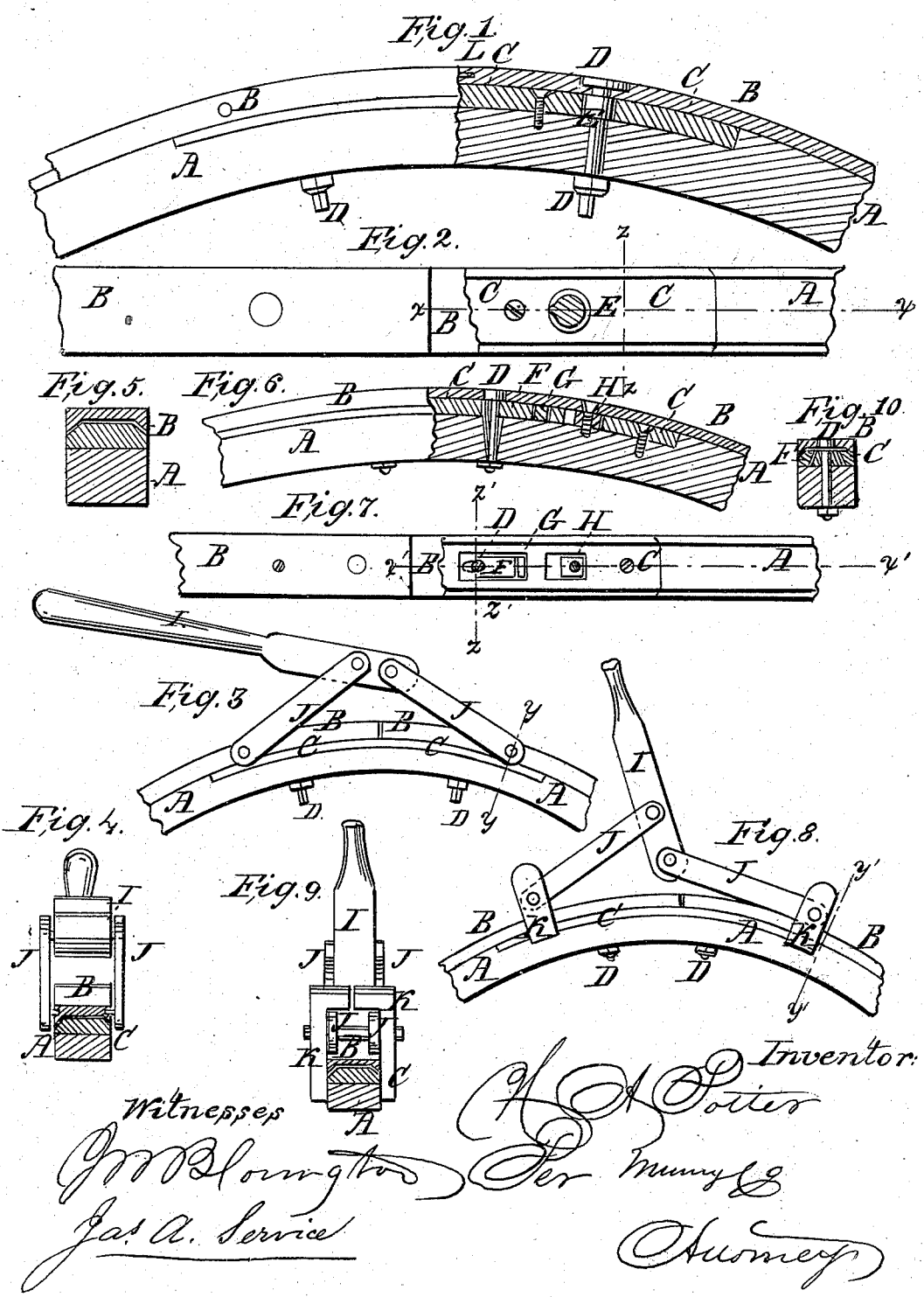

HENRY A. POTTER, OF PROVIDENCE, RHODE ISLAND.

Letters Patent No. 68,002, dated August 20, 1867.

---

IMPROVEMENT IN WHEELS FOR VEHICLES.

---

The Schedule referred to in these Letters Patent and making part of the same.

---

TO ALL WHOM IT MAY CONCERN:

Be it known that I, HENRY A. POTTER, of Providence, in the county of Providence, and State of Rhode Island, have invented a new and useful Improvement in Tire for Wheels for Vehicles; and I do hereby declare that the following is a full, clear, and exact description thereof, which will enable others skilled in the art to make and use the same, reference being had to the accompanying drawings, forming part of this specification, in which—

Figure 1 is a side view of a portion of the rim of a wheel, showing one mode of holding the strained or tightened tire to its place, partly in section, through the line $x\ x$, fig. 2.

Figure 2 is an edge view of the same, a part of the tire being broken away.

Figure 3 is a side view of the same, showing the lever-clamp in place for drawing the ends of the tire together.

Figure 4 is a detail sectional view, taken through the line $y\ y$, fig. 3.

Figure 5 is a detail cross-section of the same, taken through the line $z\ z$, fig. 2.

Figure 6 is a side view of a portion of the rim of a wheel, partly in section, through the line $x\ x$, fig. 7, showing another mode of holding the tightened tire to its place.

Figure 7 is an edge view of the same, part of the tire being broken away.

Figure 8 is a side view of the same, showing the lever-clamp in place for drawing the ends of the tire together.

Figure 9 is a detail sectional view of the same, taken through the line $y'\ y'$, fig. 8.

Figure 10 is a cross-section of the same, taken through the line $z'\ z'$, fig. 7.

Similar letters of reference indicate like parts.

My invention has for its object to furnish an improvement in the construction of wagon-tire, and in the manner of attaching it to the wheels; and it consists, first, in the combination of a flanged tire with the bevelled face or tread of the wheel; second, in the combination of a slotted plate with the felloes and with the tire of the wheels; third, in the combination of cams and bolts with the tire, the plate, and the felloes of the wheel for the purpose of holding the ends of the tire to their place; fourth, in the combination of sliding supporting-blocks with the bolts, plate, and tire of the wheel, for the purpose of supporting the bolts and holding the tire to its place; fifth, in the combination of sliding-blocks with the plate and tire of the wheel, for the purpose of temporarily holding the tire should the main bolts give way; sixth, the combination of a dowelling-pin with the ends of the tire, the whole being constructed as hereinafter more fully described.

A are the felloes of the wheel, which are made and attached to the spokes in the ordinary manner, except that the edges of the tread are bevelled to correspond with the bevel of the flanges of the tire B. The tire may be made into the proper shape and coiled into a perfect circle by the use of rollers. By constructing the tires in this way they can be worn much longer and thinner than when made in the ordinary manner, since, as is well known, the especial wear of the tire comes upon the edge, reducing its face from a flat to a semicircular form. But with my improved tire this change of form does not materially weaken it, as the different parts of the tire then have a nearly uniform thickness. C is a plate let into the felloes at that part of the wheel where the ends of the tire meet, as shown in the drawings. This plate C is secured to the felloes by screws, and it is slotted in the manner and for the purpose hereinafter described. The ends of the tire are held in their places when drawn together by bolts D passing through the tire B, through the plate C, and through the felloes A, and which are secured in place by nuts in the ordinary manner. The hole through the plate C, through which the bolt D passes, is slotted, as shown. Upon the bolt D, within the plate C, is formed a cam, which, when the ends of the tire have been drawn together, may be so adjusted as to press against the end of the slot and hold the tire securely in place. To enable the cam E to be adjusted as required, the inner ends of the bolts D are made square, so that they may be grasped and operated with a wrench; or the slot in the plate C may be made longer, with dove-tailed sides, as shown in figs. 6, 7, 10. Within this slot is placed a block, F, the forward end of which presses against and supports the bolt D, and the rear end of which rests either against the rear end of the slot or against iron blocks or wedges G, which may be placed between its rear end and the rear end of the slot to adjust the said block to the proper position for supporting the bolt. H is a small iron block fitted into a slot formed in the plate C, in which it can slide freely backward and forward, and it is securely attached to the tire B by a screw, as shown in fig. 6. The object of this block H is to give warning by its rattling, should the main bolt D break, and also to prevent the tire under such circumstances from flying from the wheel. The ends of the tire B may be drawn together for the insertion of the bolts D by a lever, wrench, or clamp. This consists of a lever, I, to the lower end of which are pivoted two pairs of arms, J. To the lower ends of these arms are attached inwardly-projecting pins, which are inserted in holes formed in the edges of the tire, as shown in figs. 1 and 3. Then, by operating the lever I, the ends of the tire may easily be drawn together and held until the bolts D are inserted and adjusted. But when the tire is too light to allow holes to be made in its edges, or when the work is of such a character that the holes would disfigure the wheel, the pins in the lower ends of the arms J are replaced by the jaws K of a clamp, by which the edges of the tire are held, while the ends of said tire are drawn together by operating the lever I, as before described. L is a pin fitting into holes in the ends of the tire, in the manner of a dowelling-pin, and which prevents either end of the tire from rising above the other end, and thus interfering with the smooth advance of the wheel.

Having thus described my invention, I claim as new, and desire to secure by Letters Patent—

1. The bevelled felloes A, in combination with the plate C, tire B, bolt D, provided with cam E, substantially as herein shown and described, and for the purpose specified.

2. The sliding-blocks F H, in combination with the tire B, plate C, and bolts D, substantially as herein set forth and for the purpose specified.

The above specification of my invention signed by me this 9th day of April, 1866.

HENRY A. POTTER.

Witnesses:
    HENRY MARTIN,
    ALBERT M. HEWITT.